United States Patent
Murschall et al.

(10) Patent No.: US 7,045,200 B2
(45) Date of Patent: *May 16, 2006

(54) WHITE, UV-STABILIZED FILM MADE FROM A CRYSTALLIZABLE THERMOPLASTIC

(75) Inventors: Ursula Murschall, Nierstein (DE); Guenther Crass, Taunusstein (DE); Guenter Bewer, Wiesbaden (DE); Klaus Oberlaender, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 592 days.

This patent is subject to a terminal disclaimer.

(21) Appl. No.: 10/128,563

(22) Filed: Apr. 24, 2002

(65) Prior Publication Data

US 2002/0176978 A1    Nov. 28, 2002

Related U.S. Application Data

(63) Continuation of application No. 09/568,489, filed on May 10, 2000, now abandoned.

(30) Foreign Application Priority Data

May 10, 1999   (DE) ............................... 199 21 341
Sep. 23, 1999  (DE) ............................... 199 45 559

(51) Int. Cl.
      *C08K 3/34*   (2006.01)
(52) U.S. Cl. .................. 428/220; 524/423; 524/425; 524/447; 524/492
(58) Field of Classification Search .................. 428/220
      See application file for complete search history.

(56) References Cited

U.S. PATENT DOCUMENTS

| | | |
|---|---|---|
| 5,680,720 A | 10/1997 | Asazuma et al. |
| 6,149,995 A | 11/2000 | Peiffer et al. |
| 6,200,511 B1 | 3/2001 | Peiffer et al. |
| 6,214,440 B1 | 4/2001 | Peiffer et al. |
| 6,238,782 B1 | 5/2001 | Hellmann et al. |
| 6,261,663 B1 | 7/2001 | Peiffer et al. |
| 6,280,833 B1 | 8/2001 | Peiffer et al. |
| 6,291,053 B1 | 9/2001 | Peiffer et al. |
| 6,358,579 B1 | 3/2002 | Peiffer et al. |
| 6,358,604 B1 | 3/2002 | Peiffer et al. |
| 6,376,042 B1 | 4/2002 | Peiffer et al. |
| 6,383,585 B1 | 5/2002 | Peiffer et al. |
| 6,391,410 B1 | 5/2002 | Peiffer et al. |
| 6,409,862 B1 | 6/2002 | Kliesch et al. |
| 6,410,132 B1 | 6/2002 | Peiffer et al. |
| 6,521,351 B1 * | 2/2003 | Murschall et al. .......... 428/480 |
| 6,528,144 B1 | 3/2003 | Peiffer et al. |
| 6,534,169 B1 | 3/2003 | Pfeiffer et al. |
| 6,537,647 B1 | 3/2003 | Peiffer et al. |
| 6,551,686 B1 | 4/2003 | Hellmann et al. |
| 6,565,936 B1 | 5/2003 | Peiffer et al. |
| 6,641,924 B1 | 11/2003 | Peiffer et al. |
| 6,689,454 B1 * | 2/2004 | Murschall et al. .......... 428/328 |
| 6,849,325 B1 * | 2/2005 | Murschall et al. .......... 428/212 |
| 6,855,435 B1 | 2/2005 | Murschall et al. |
| 2004/0028926 A1 | 2/2004 | Peiffer et al. |

FOREIGN PATENT DOCUMENTS

| | | |
|---|---|---|
| EP | 0 044 515 | 1/1982 |
| EP | 0 078 633 | 5/1983 |
| EP | 0 200 190 B1 | 11/1986 |
| EP | 0 620 245 | 10/1994 |
| WO | WO 98/06575 | 2/1998 |

OTHER PUBLICATIONS

Patent Abstract of Japan, vol. 017, No. 689 (c-1143), Dec. 16, 1993—& JP 05 230238 A (Toyobo Co Ltd.), Sep. 7, 1993.

Day, M. et al., "Photochemical Degradation of Poly(ethylene) Terephthalate). III. Determination of Decomposition Products and Reaction Mechanism," Journal of Applied Polymer Science, vol. 16, pp. 203 (1972).

* cited by examiner

*Primary Examiner*—Edward J. Cain
(74) *Attorney, Agent, or Firm*—Finnegan, Henderson, Farabow, Garrett & Dunner, LLP

(57) ABSTRACT

A white film whose thickness is in the range from 1 to 500 μm and which comprises, as principal constituent, a crystallizable thermoplastic, wherein the film comprises at least one UV stabilizer as light stabilizer and at least one white pigment, the use of the film, and also a process for its production.

33 Claims, No Drawings

WHITE, UV-STABILIZED FILM MADE FROM A CRYSTALLIZABLE THERMOPLASTIC

This is a continuation of Application No. 09/568,489, filed May 10, 2000, now abandoned, which is incorporated herein by reference.

This application claims priority benefit under 35 U.S.C. § 119 of German patent application no. 199 21 341.0, filed on May 10, 1999, and German patent application no. 199 45 559.7, filed on Sep. 23, 1999. The contents of both of these priority documents are incorporated by reference herein.

FIELD OF THE INVENTION

The invention relates to a white, UV-stabilized film whose thickness is in the range from 1 to 500 μm and which is made from a crystallizable thermoplastic. The film comprises at least one pigment and one UV stabilizer as light stabilizer and is distinguished by good orientability and excellent optical and mechanical properties. The invention further relates to the use of this film, and also to a process for its production.

DESCRIPTION OF THE RELATED ART

White films of thickness from 1 to 500 μm are well known.

These films do not comprise any type of UV stabilizer as light stabilizer, and therefore neither the films nor the items produced from them are suitable for outdoor applications. After only a short time in outdoor applications the films exhibit yellowing and impairment of their mechanical properties due to photooxidative degradation by sunlight.

EP-A-0 620 245 describes films of improved thermal stability. These films comprise antioxidants suitable for scavenging free radicals formed in the film and destroying any peroxide formed. However, no proposal can be found in this text as to how the UV stability of films of this type might be improved.

WO 98/06575 describes a matt, sealable film which comprises at least one UV absorber. The UV absorber here has to ensure that there is no drastic impairment of the mechanical properties of the film after weathering. The sealability is achieved by coextruding the film with a copolyester. The nonsealable side must be rough and therefore low-gloss and matt, in order that the film can be wound up and further processed, since these copolyesters have high adhesion to the nonsealable side. The tendency to adhere is reduced by the high roughness and by adding pigments. The text makes no suggestion as to how a low Yellowness Index (<55) can be achieved.

SUMMARY OF THE INVENTION

An object of the present invention was to provide a white film of thickness from 1 to 500 μm which, besides good orientability, good mechanical and optical properties, and a low Yellowness Index, has in particular high UV stability and provides a high level of protection from the adverse effects of light.

High UV stability means that the films are not damaged, or only very slightly damaged, by sunlight or other UV radiation, and that they are therefore suitable for outdoor applications and/or critical indoor applications. In particular, when used outdoors for a number of years the films should not yellow and not exhibit embrittlement or surface-cracking, nor show any impairment of their mechanical properties. High UV stability therefore means that the film absorbs UV light and only transmits light once the visible range has been reached.

Examples of good optical properties are homogeneous, streak-free pigmentation, low luminous transmittance (≦80%), acceptable surface gloss, and also a Yellowness Index which is virtually unchanged from that of the unstabilized film.

Good mechanical properties include a high modulus of elasticity ($E_{MD}$>3300 N/mm$^2$; $E_{TD}$>4800 N/mm$^2$) and also good tear resistance (in MD>130 N/mm$^2$; in TD>180 N/mm$^2$) and good longitudinal and transverse elongation at break (in MD>120%; in TD>70%).

Good orientability includes excellent capabilities of the film for orientation both longitudinally and transversely without break-offs.

In addition, the novel film should be recyclable, in particular without loss of the optical and mechanical properties, and also, if desired, should have low combustibility, so that it can also be used, for example, for indoor applications and in the construction of exhibition stands.

This object is achieved by means of a white film whose thickness is in the range from 1 to 500 μm and which comprises, as principal constituent, a crystallizable thermoplastic, wherein the film comprises at least one UV stabilizer as light stabilizer, at least one white pigment and, if desired, an optical brightener, where the UV stabilizer and/or the white pigment and/or the optical brightener are directly fed as masterbatch during film production.

DETAILED DESCRIPTION OF THE INVENTION

The white film of the invention comprises, as principal constituent, a crystallizable thermoplastic. Examples of suitable crystallizable or semicrystalline thermoplastics are polyethylene terephthalate, polybutylene terephthalate and polyethylene naphthalate, preferably polyethylene terephthalate.

According to the invention, crystallizable thermoplastics are
crystallizable homopolymers,
crystallizable copolymers,
crystallizable compounds,
crystallizable recycled material, and
other types of crystallizable thermoplastics.

The white film may have one layer or two or more layers. It may also have a coating of various copolyesters or adhesion promoters.

The white film comprises at least one UV stabilizer as light stabilizer, and this is usefully fed directly during film production, using masterbatch technology. The concentration of the UV stabilizer is preferably from 0.01% by weight to 5% by weight, based on the weight of the crystallizable thermoplastic.

The white film also comprises at least one pigment for white coloration. The concentration of the pigment is preferably from 0.3 to 25% by weight, based on the weight of the crystallizable thermoplastic. The white pigment is also preferably fed directly during film production using masterbatch technology.

Light, in particular the ultraviolet portion of sunlight, i.e. the wavelength range from 280 to 400 nm, causes degradation in thermoplastics, as a result of which their appearance changes, due to color change or yellowing, and their mechanical and physical properties are adversely affected.

Inhibition of this photooxidative degradation is of considerable industrial and commercial importance, since without it the scope of application of many thermoplastics is severely restricted.

Polyethylene terephthalates, for example, already begin to absorb UV light at under 360 nm, and their absorption increases considerably at under 320 nm and is very pronounced at under 300 nm. Maximum absorption occurs between 280 and 300 nm.

In the presence of oxygen it is primarily chain cleavages, and not crosslinking, which is observed. The predominant photooxidation products are carbon monoxide, carbon dioxide and carboxylic acids. Other oxidation reactions which have to be taken into consideration, besides the direct photolysis of the ester groups, proceed via peroxide radicals, again resulting in formation of carbon dioxide.

However, the photooxidation of polyethylene terephthalates may also proceed via elimination of hydrogen at the a position of the ester groups to give hydroperoxides and their decomposition products, and also chain cleavages associated therewith (H. Day, D. M. Wiles: J. Appl. Polym. Sci. 16, 1972, page 203).

Light stabilizers which are UV stabilizers or UV absorbers are chemical compounds which can intervene in the physical and chemical processes of light-induced degradation. Carbon black and other pigments can provide some degree of protection from the adverse effects of light, but these substances are unsuitable for white films since they cause discoloration or color change. The only compounds suitable for white films are organic or organometallic compounds which give no, or only an extremely low level of, color or color change to the thermoplastic to be stabilized. Light stabilizers which are suitable UV stabilizers absorb at least 70%, preferably 80%, particularly preferably 90%, of the UV light in the wavelength range from 180 to 380 nm, preferably from 280 to 350 nm. Those which are particularly suitable are those which in the temperature range from 260 to 300° C. are thermally stable, i.e. do not decompose and do not cause release of gases. Examples of light stabilizers which are suitable UV stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, sterically hindered amines and triazines, preferably the 2-hydroxybenzotriazoles and the triazines.

A further constituent present in the film if desired, according to the invention, is an optical brightener. The optical brighteners according to the invention are capable of absorbing UV radiation in the wavelength range from about 360 to 380 nm and of emitting this again as visible, longer-wavelength, blue-violet light. Suitable optical brighteners are bisbenzoxazoles, phenylcoumarins and bissterylbiphenyls, in particular phenyl coumarin, and particularly preferably triazine-phenylcoumarin (Tinopal®, Ciba-Geigy, Basle, Switzerland).

Besides the optical brightener, blue dyes soluble in polyester may also be added if this is useful. Dyes which have proven successful are cobalt blue, ultramarine blue and anthraquinone dyes, in particular Sudan blue 2 (BASF, Ludwigshafen, Germany).

The amounts of the optical brighteners used are from 10 to 50,000 ppm, in particular from 20 to 30,000 ppm, particularly preferably from 50 to 25,000 ppm (based on the weight of the layer to be provided with these).

The amounts of the blue dyes used are from 10 to 10,000 ppm, in particular from 20 to 5000 ppm, particularly preferably from 50 to 1000 ppm (based on the weight of the layer to be provided with these).

Suitable white pigments are preferably titanium dioxide, barium sulfate, calcium carbonate, kaolin and silica, and preference is given to titanium dioxide and barium sulfate.

The titanium dioxide particles may be composed of anatase or of rutile, preferably predominantly of rutile, which has higher hiding powder than anatase. In a preferred embodiment 95% by weight of the titanium dioxide particles are rutile. They may be prepared by a conventional process, e.g. by the chloride or sulfate process. The amount of these in the base layer is usefully from 0.3 to 25% by weight, based on the base layer. The average particle size is relatively low and is preferably in the range from 0.10 to 0.30 µm.

Using titanium dioxide of the type described, no vacuoles are produced within the polymer matrix during film production.

The titanium dioxide particles may have a coating of inorganic oxides, such as usually used as a coating for $TiO_2$ white pigment in papers or paints to improve lightfastness.

It is known that $TiO_2$ is photoactive. On exposure to UV radiation free radicals form on the surfaces of the particles. These free radicals may migrate into the polymer matrix, and this causes degradation reactions and yellowing. To avoid this, the $TiO_2$ particles may be oxidically coated. Oxides particularly suitable for the coating include those of aluminum, silicon, zinc or magnesium, or mixtures of two or more of these compounds. $TiO_2$ particles with a coating of a number of these compounds are described, for example, in EP-A-0 044 515 and EP-A-0 078 633. The coating may also comprise organic compounds having polar and nonpolar groups. The organic compounds must have sufficient thermal stability during processing of the film by extrusion of the polymer melt. Examples of polar groups are —OH; —OR; —COOX; (X=R; H or Na, R=alkyl having from 1 to 34 carbon atoms). Preferred organic compounds are alkanols and fatty acids having from 8 to 30 carbon atoms in the alkyl group, in particular fatty acids and primary n-alkanols having from 12 to 24 carbon atoms, and also polydiorganosiloxanes and/or polyorganohydrosiloxanes, e.g. polydimethylsiloxane and polymethylhydrosiloxane.

The coating for the titanium dioxide particles is usually composed of from 1 to 12 g, in particular from 2 to 6 g of inorganic oxides and/or from 0.5 to 3 g, in particular from 0.7 to 1.5 g of organic compound, based on 100 g of titanium dioxide particles. The coating is usually applied to the particles in aqueous suspension. The inorganic oxides may be precipitated from water-soluble compounds, e.g. an alkali metal nitrate, in particular sodium nitrate, sodium silicate (water glass) or silica in aqueous suspension.

Inorganic oxides such as $Al_2O_3$ or $SiO_2$ also include the hydroxides or their various stages of dehydration, e.g. oxide hydrate, where the exact composition and structure of these is not known. The oxide hydrates, for example of aluminum and/or silicon, are precipitated onto the $TiO_2$ pigment after ignition and grinding in aqueous suspension, and the pigments are then washed and dried. This precipitation may therefore be carried out directly in a suspension produced in the production process after the ignition and the subsequent wet grinding. The oxides and/or oxide hydrates of the respective metals are precipitated from the water-soluble metal salts in the known pH range. For aluminum, for example, aluminum sulfate is used in aqueous solution (pH below 4) and the oxide hydrate is precipitated by adding aqueous ammonia or sodium hydroxide solution in the pH range from 5 to 9, preferably from 7 to 8.5. If a water glass solution or alkali metal aluminate solution is used as starting material, the pH of the TiO$_2$ suspension initially charged should be in the strongly alkaline range (pH above 8). The precipitation is then carried out by adding mineral acid, such as sulfuric acid, in the pH range from 5 to 8. After precipitation of the metal oxides, stirring of the suspension continues for from 15 min to about 2 h, whereupon the precipitated layers undergo aging. The coated product is removed from the aqueous dispersion and washed and dried at elevated temperatures, in particular at from 70 to 100° C.

It was highly surprising that the use of the abovementioned UV stabilizers and, if present, brighteners in films gave the desired result. The person skilled in the art would probably have initially attempted to achieve some degree of UV stability by using an antioxidant but would have found that the film rapidly yellows on weathering.

In the knowledge that UV stabilizers absorb UV light and therefore provide protection, the skilled worker would be likely to have used commercially available UV stabilizers. He would then have observed that the UV stabilizer has unsatisfactory thermal stability and at temperatures of from 200 to 240° C. decomposes or releases gases, and large amounts (from about 10 to 15% by weight) of UV stabilizer have to be incorporated so that the UV light is absorbed and the film therefore not damaged.

At these high concentrations he would have observed that the film is already yellow just after it has been produced, with Yellowness Index deviations (YID) around 25. He would have also observed that its mechanical properties are adversely affected. Orientation would have produced exceptional problems, such as Formula Ia: 2-(4,6-Diphenyl-1,3-5-triazin-2-yl)-5-(hexyloxy)phenol

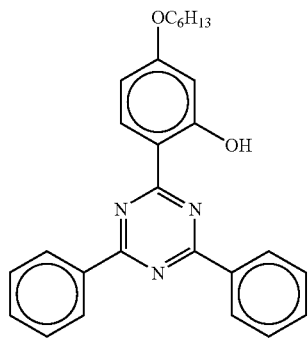

Formula Ib: 2,2'-Methylenebis(6-2H-benzotriazol-2-yl)4-(1,1,3,3,tetramethylbutyl)phenol

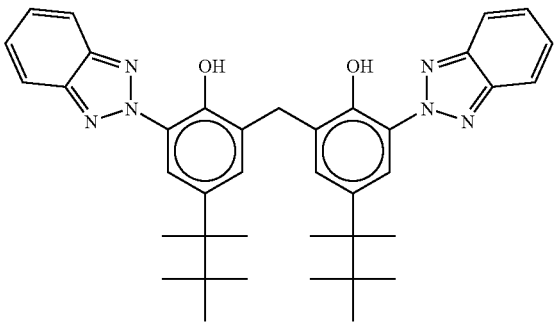

break-offs due to unsatisfactory strength, i.e. modulus of elasticity, die deposits, causing profile variations, roller deposits from the UV stabilizer, causing impairment of optical properties (defective adhesion, nonuniform surface), and deposits in stretching or heat-setting frames, dropping onto the film.

It was therefore more than surprising that even low concentrations of the UV stabilizer according to the invention, if desired combined with the optical brightener and the blue dye, achieve excellent UV protection. It was very surprising that, together with this excellent UV protection the Yellowness Index of the film is unchanged from that of an unstabilized film within the limits of measurement accuracy, there are no releases of gases, no die deposits and no frame condensation, and the film therefore has excellent optical properties and excellent profile and layflat, and the UV-stabilized film has excellent stretchability, and can therefore be produced in a reliable and stable manner on high-speed film lines at speeds of up to 420 m/min.

The film is therefore also commercially viable.

It is also very surprising that even the recycled material can be reused without any adverse effect on the Yellowness Index of the film.

In a particularly preferred embodiment, the novel white film comprises, as principal constituent, a crystallizable polyethylene terephthalate and from 0.01 to 5.0% by weight of 2-(4,6-diphenyl-1,3,5-triazin-2-yl)-5-(hexyloxy)phenol of the formula Ia or from 0.01 to 5.0% by weight of 2,2'-methylenebis(6-2H-benzotriazol-2-yl) 4-(1,1,3,3-tetramethylbutyl)phenol of the formula Ib, Formula Ia: 2-(4,6-Diphenyl-1,3,5-triazin-2-yl)-5-(hexyloxy)phenol

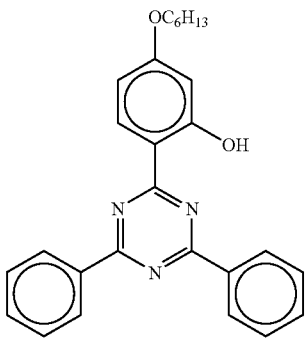

Formula Ib: 2,2'-Methylenebis(6-2H-benzotriazol-2-yl)-4-(1,1,3,3,-tetramethylbutyl)phenol

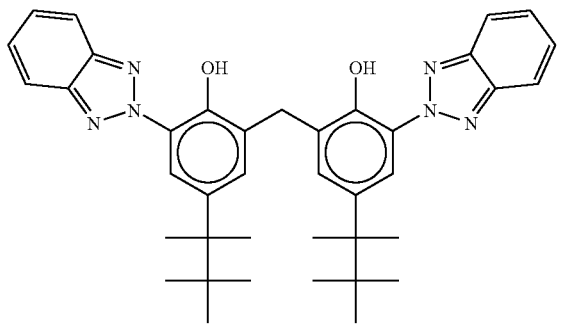

and also from 0.3 to 25% by weight of titanium dioxide, usefully with a particle diameter of from 0.10 to 0.50 µm, preferably a titanium dioxide of rutile type. Instead of titanium dioxide it is also possible to use barium sulfate, preferably with a particle diameter of from 0.20 to 1.20 µm as white pigment. The concentration here is usually from 1.0 to 25% by weight. In a preferred embodiment mixtures of these white pigments, or a mixture of one of these white pigments with another white pigment, may also be used. In a preferred embodiment it is also possible to use mixtures of the UV stabilizers mentioned or mixtures of at least one of the preferred UV stabilizers with other UV stabilizers, where the total concentration of light stabilizer is preferably from 0.01 to 5.0% by weight, based on the weight of crystallizable polyethylene terephthalate.

The surface gloss, measured to DIN 67530 (measurement angle 200), is greater than 15, preferably greater than 20.

The luminous transmittance (transparency), measured to ASTM-D 1003, is less than 80%, preferably less than 70%. The pigmentation is homogeneous and free from streaking over the running length and the width of the film.

The longitudinal modulus of elasticity (ISO 527-1-2) is greater than 3300 N/mm$^2$, preferably greater than 3600 N/mm$^2$. The transverse modulus of elasticity (ISO 527-1-2) is greater than 4800 N/mm$^2$, preferably greater than 5100 N/mm$^2$.

The standard viscosity SV (DCA) of the polyethylene terephthalate, measured in dichloroacetic acid to DIN 53728, is from 600 to 1000, preferably from 700 to 900.

The intrinsic viscosity IV (DCA) is calculated from the standard viscosity SV (DCA) as follows:

$$IV(DCA)=6.67\times10^{-4}SV(DCA)+0.118$$

The white polyethylene terephthalate film, which comprises at least one white pigment and one UV stabilizer, may have one layer or else two or more layers.

In the embodiment having two or more layers the film is composed of at least one core layer and at least one outer layer, and particular preference is given to a three-layer A-B-A or A-B-C structure.

For this embodiment it is important that the standard viscosity of the polyethylene terephthalate of the core layer is similar to that of the polyethylene terephthalate of the outer layer(s) adjacent to the core layer.

In a particular embodiment, the outer layers may also be composed of a polyethylene naphthalate homopolymer or of a polyethylene terephthalate-polyethylene naphthalate copolymer or of a compound.

In this embodiment, the standard viscosity of the thermoplastics of the outer layers is again similar to that of the polyethylene terephthalate of the core layer.

In the embodiment having two or more layers the white pigment is preferably present in the core layer. If required, the outer layers may also have white pigment.

In the embodiment having two or more layers, the UV stabilizer and the optical brightener, if present, and the blue dye, if present, are preferably in the outer layer(s). However, if required the core layer may also have been provided with UV stabilizers and, if desired, with optical brightener and, if desired, with blue dye.

Unlike in the single-layer embodiment, the concentration here of the stabilizer(s) (optical brightener/blue dye) is based on the weight of the thermoplastics in the layer provided with UV stabilizer(s) (optical brightener/blue dye).

The film may also have, at least on one side, a scratch-resistant coating, a copolyester or an adhesion promoter.

Very surprisingly, weathering experiments to the test specification of ISO 4892 using an Atlas Ci 65 Weather-Ometer have shown that, in the case of a three-layer film, provision of UV stabilizers, if desired combined with an optical brightener and blue dye, in the outer layers of from 0.5 to 2 µm thickness is fully sufficient.

As a result, the UV-stabilized films having two or more layers and produced using known coextrusion technology are of greater commercial interest than the fully UV-stabilized monofilms, since significantly less UV stabilizer is needed to achieve comparable UV stability.

Weathering tests have shown that, even after from 5 to 7 years (extrapolated from the weathering tests) in outdoor applications the novel UV-stabilized films generally show no increased yellowing, no embrittlement, no loss of surface gloss, no surface cracking and no impairment of their mechanical properties.

During production of the film it was observed that the UV-stabilized film has excellent capability for longitudinal and transverse orientation, without break-off. In addition, no gas releases of any type resulting from use of the UV stabilizer and/or of, if present, the optical brightener and/or the blue dye were observed in the production process, and this is significant for the invention, since most UV stabilizers give problematic and undesirable release of gases at extrusion temperatures above 260° C., making them unusable.

Measurements also showed that starting at a thickness of 300 µm the novel PET film has low combustibility and low flammability, and is therefore suitable, for example, for indoor applications and for the construction of exhibition stands. Surprisingly, even in the thickness range from 350 to 500 µm the novel films qualify for building materials classification B2. Surprisingly, films of from 350 to 500 µm also qualify for fire protection grade S4 of DIN 5510, smoke generation SR2 and burning droplets performance ST1.

The novel film can also readily be recycled without pollution of the environment and without loss of mechanical properties, and it is therefore suitable, for example, for use as fast-turnover advertising placards or other promotional items.

The novel white, UV-stabilized film may be produced, for example, by extrusion on an extrusion line.

According to the invention, the white pigment, the light stabilizer, the optical brightener, if present, and the blue dye, if present, may be added by the actual producer of the thermoplastic raw material, or fed to the extruder during film production.

The light stabilizer, the white pigment, the optical brightener, if present, and/or the blue dye, if present, are particularly preferably added using masterbatch technology. The abovementioned light-stabilizing components and/or the white pigment are dispersed completely in a solid carrier material. Possible carrier materials are the thermoplastic itself, e.g. the polyethylene terephthlate, or else other polymers which have sufficient compatibility with the thermoplastic.

It is important that the particle size and the bulk density of the masterbatch is similar to the particle size and the bulk density of the thermoplastic, so that uniform distribution is achieved, and with this uniform UV stabilization and uniform whiteness.

The polyester films may be produced by known processes from a polyester raw material with, if desired, other raw materials, and also with the UV stabilizer, the white pigment, the optical brightener if present, the blue dye if present, and/or a usual amount of from 0.1 to a maximum of 10% by weight of any other usual additives present, either in the form of monofilms or else in the form of, if desired, coextruded films having two or more layers and with identical or differently constructed surfaces, where one surface may have, for example, pigment/UV stabilizer, and no pigment and/or UV stabilizer is present at the other surface. One or both surfaces of the film may also be provided with a conventional functional coating, using known processes.

In the preferred extrusion process for producing the polyester film, the melted polyester material is extruded through a slot die and, in the form of a substantially amorphous prefilm, quenched on a chill roll. This film is then reheated and stretched longitudinally and transversely, or transversely and longitudinally, or longitudinally, transversely and again longitudinally and/or transversely. The stretching temperatures are generally $T_g+10°$ C. to $T_g+60°$ C. ($T_g$=glass transition temperature), and the usual stretching ratio is from 2 to 6, in particular from 3 to 4.5, for the longitudinal stretching, and from. 2 to 5, in particular from 3 to 4.5, for the transverse stretching, and from 1.1 to 3 for any second longitudinal stretching carried out. The first longitudinal stretching may, if desired, be carried out simultaneously with the transverse stretching (simultaneous stretching). There then follows the heat-setting of the film at oven temperatures of from 200 to 260° C., in particular from 220 to 250° C. The film is then cooled and wound up.

The surprising combination of excellent properties makes the novel white, UV-stabilized film highly suitable for a wide variety of applications, for example for internal decoration, for the construction of exhibition stands and exhibition items, for displays, for placards, for labels, for protective glazing in machines and vehicles, in the lighting sector, in fitting out shops and stores, as a promotional product or laminating material, and in food and drink applications.

The good UV stability of the novel white film also makes it suitable for outdoor applications, e.g. roofing systems, external cladding, protective coverings, applications in the construction sector, and illuminated advertising profiles, and in the transport sector.

The invention is described in more detail below using working examples.

The following standards or methods are used here for measuring the individual properties.

Test Methods

Surface Gloss:

Surface gloss is measured to DIN 67530 with a measurement angle of 20°.

Luminous Transmittance:

Luminous transmittance is the ratio of total transmitted light to the amount of incident light.

Luminous transmittance is measured to ASTM D 1003 using "Hazegard plus" test equipment.

Surface Defects and Uniformity of Coloration:

Surface defects and uniformity of coloration are determined visually.

Mechanical Properties:

Modulus of elasticity, tear resistance and elongation at break are measured in longitudinal and transverse directions to ISO 527-1-2.

SV (DCA) and IV (DCA):

Standard viscosity SV (DCA) is measured by a method based on DIN 53726, in dichloroacetic acid.

Intrinsic viscosity (IV) is calculated as follows from the standard viscosity (SV):

$$IV(DCA)=6.67\times10^{-4}SV(DCA)+0.118$$

Weathering (Bilateral) and UV Stability:

UV stability is tested to the test specification of ISO 4892 as follows:

| | |
|---|---|
| Test equipment: | Atlas Ci 65 Weather-Ometer |
| Test conditions: | ISO 4892, i.e. artificial weathering |
| Irradiation time: | 1000 hours (per side) |
| Irradiation: | 0.5 W/m², 340 nm |
| Temperature: | 63° C. |
| Relative humidity: | 50% |
| Xenon lamp: | Internal and external filter made from borosilicate |
| Irradiation cycles: | 102 minutes of UV light, then 18 minutes of UV light with water spray onto the specimens, then another 102 minutes of UV light, etc. |

Yellowness Index:

The Yellowness Index is the deviation from the colorless condition in the "yellow" direction and is measured to DIN 6167. Yellowness Indices of £5 are not visually detectable.

The white films having one layer or two or more layers in the examples and comparative examples below are produced on the extrusion line described.

Each of the films was weathered to the test specification of ISO 4892 for 1000 hours per side using an Atlas Ci 65

Weather-Ometer, and then tested for mechanical properties, discoloration, surface defects, luminous transmittance and gloss.

EXAMPLE 1

A white film is produced which has a thickness of 50 μm and comprises, as principal constituent, polyethylene terephthalate, 7.0% by weight of titanium dioxide and 1.0% by weight of the UV stabilizer 2-(4,6-diphenyl-1,3,5-triazin-2-yl)-5-(hexyloxy)phenol (®Tinuvin 1577 from Ciba-Geigy).

The titanium dioxide is of rutile type and its average particle diameter is 0.20 μm, and it has a coating of $Al_2O_3$.

Tinuvin 1577 has a melting point of 149° C. and is thermally stable to about 330° C.

To achieve uniform distribution, 7.0% by weight of titanium dioxide and 1.0% by weight of the UV stabilizer are incorporated directly into the polyethylene terephthalate by the raw material producer.

The polyethylene terephthalate used to produce the white film has a standard viscosity SV (DCA) of 810, corresponding to an intrinsic viscosity IV (DCA) of 0.658 dl/g. The moisture content is <0.2%.

The white PET film produced has the following property profile:

| | |
|---|---|
| Thickness | 50 μm |
| Surface gloss, side 1 | 72 |
| (Measurement angle 20°) side 2 | 68 |
| Luminous transmittance | 28% |
| Surface defects per $m^2$ | none |
| Longitudinal mod. of elasticity | 4300 N/mm² |
| Transverse mod. of elasticity | 5600 N/mm² |
| Longitudinal tear resistance | 190 N/mm² |
| Transverse tear resistance | 280 N/mm² |
| Longitudinal elongation at break | 170% |
| Transverse elongation at break | 85% |
| Yellowness Index (YID) | 48 |
| Pigmentation | uniform |

After 1000 hours of weathering per side Using an Atlas Ci 65 Weather-Ometer the PET film has the following properties:

| | |
|---|---|
| Thickness | 50 μm |
| Surface gloss, side 1 | 70 |
| (Measurement angle 20°) side 2 | 66 |
| Luminous transmittance | 27% |
| Surface defects (cracks, signs of embrittlement) | none |
| Yellowness Index (YID) | 49 |
| Longitudinal mod. of elasticity | 4150 N/mm² |
| Transverse mod. of elasticity | 5600 N/mm² |
| Longitudinal tear resistance | 170 N/mm² |
| Transverse tear resistance | 250 N/mm² |
| Longitudinal elongation at break | 150% |
| Transverse elongation at break | 70% |
| Pigmentation | uniform |

EXAMPLE 2

A white film is produced in a manner similar to that of Example 1. The UV stabilizer 2-(4,6-diphenyl-1,3,5-triazin-2-yl)-5-(hexyloxy)phenol (®Tinuvin 1577) is fed in the form of a masterbatch. The masterbatch is composed of 5% by weight of Tinuvin 1577 as active component and 95% by weight of the polyethylene terephthalate of Example 1.

Prior to extrusion, 90% by weight of the titanium-dioxide-containing polyethylene terephthalate of Example 1 are dried with 10% by weight of the masterbatch at 170° C. Extrusion and film production are carried out in a manner similar to that of Example 1.

The white PET film produced has the following property profile:

| | |
|---|---|
| Thickness | 50 μm |
| Surface gloss, side 1 | 74 |
| (Measurement angle 20°) side 2 | 71 |
| Luminous transmittance | 27% |
| Surface defects (fish-eyes, orange peel, bubbles, etc.) | none |
| Longitudinal mod. of elasticity | 4200 N/mm² |
| Transverse mod. of elasticity | 5650 N/mm² |
| Longitudinal tear resistance | 160 N/mm² |
| Transverse tear resistance | 250 N/mm² |
| Longitudinal elongation at break | 160% |
| Transverse elongation at break | 75% |
| Yellowness Index | 46 |
| Pigmentation | uniform |

After 1000 hours of weathering per side using an Atlas Ci 65 Weather-Ometer the PET film has the following properties:

| | |
|---|---|
| Thickness | 50 μm |
| Surface gloss, side 1 | 72 |
| (Measurement angle 20°) side 2 | 70 |
| Luminous transmittance | 25% |
| Haze | 4.1% |
| Surface defects (cracks, embrittlement) | none |
| Yellowness Index (YID) | 47 |
| Longitudinal mod. of elasticity | 4050 N/mm² |
| Transverse mod. of elasticity | 5500 N/mm² |
| Longitudinal tear resistance | 151 N/mm² |
| Transverse tear resistance | 238 N/mm² |
| Longitudinal elongation at break | 152% |
| Transverse elongation at break | 68% |

EXAMPLE 3

A white film of 350 μm thickness is produced in a manner similar to that of Example 2. The PET film produced has the following property profile:

| | |
|---|---|
| Thickness | 350 μm |
| Surface gloss, side 1 | 70 |
| (Measurement angle 20°) side 2 | 60 |
| Luminous transmittance | 10% |
| Surface defects per $m^2$ (fish-eyes, orange peel, bubbles, etc.) | none |
| Yellowness Index | 50 |
| Longitudinal mod. of elasticity | 3600 N/mm² |
| Transverse mod. of elasticity | 4200 N/mm² |
| Longitudinal tear resistance | 180 N/mm² |
| Transverse tear resistance | 200 N/mm² |
| Longitudinal elongation at break | 220% |
| Transverse elongation at break | 190% |

After 1000 hours of weathering per side with an Atlas Ci 65 Weather-Ometer the PET film has the following properties:

| | |
|---|---|
| Thickness | 350 μm |
| Surface gloss, side 1 | 68 |
| (Measurement angle 20°) side 2 | 65 |
| Luminous transmittance | 9% |
| Surface defects (cracks, embrittlement) | none |
| Yellowness Index (YID) | 52 |
| Longitudinal mod. of elasticity | 3500 N/mm² |
| Transverse mod. of elasticity | 4050 N/mm² |
| Longitudinal tear resistance | 165 N/mm² |
| Transverse tear resistance | 185 N/mm² |
| Longitudinal elongation at break | 200% |
| Transverse elongation at break | 170% |

EXAMPLE 4

Coextrusion technology is used to produce a multilayer PET film of 50 μm thickness with the layer sequence A-B-A, where B is the core layer and A are the outer layers. The thickness of the core layer B is 48 μm, and each of the two outer layers covering the core layer has a thickness of 1 μm.

The titanium-dioxide-containing polyethylene terephthalate used for the core layer B is identical with that of Example 2. The polyethylene terephthalate of the outer layers A is identical with the polyethylene terephthalate of Example 2 except that no titanium dioxide is present.

The 5% strength by weight ®Tinuvin 1577 masterbatch is used in a manner similar to that of Example 2, but 20% by weight of the masterbatch are fed, using masterbatch technology, only to the outer layers of 1 μm thickness.

The white, multilayer PET film produced, UV-stabilized in the outer layers, has the following property profile:

| | |
|---|---|
| Layer structure | A-B-A |
| Overall thickness | 50 μm |
| Surface gloss, side 1 | 124 |
| (Measurement angle 20°) side 2 | 119 |
| Luminous transmittance | 30% |
| Surface defects (fish-eyes, orange peel, bubbles, etc.) | none |
| Longitudinal mod. of elasticity | 4300 N/mm² |
| Transverse mod. of elasticity | 5720 N/mm² |
| Longitudinal tear resistance | 180 N/mm² |
| Transverse tear resistance | 265 N/mm² |
| Longitudinal elongation at break | 165% |
| Transverse elongation at break | 85% |
| Yellowness Index (YID) | 40 |
| Pigmentation | uniform |

After 1000 hours of weathering per side with an Atlas Ci 65 Weather-Ometer the multilayer film has the following properties:

| | |
|---|---|
| Layer structure | A-B-A |
| Overall thickness | 50 μm |
| Surface gloss, side 1 | 120 |
| (Measurement angle 20°) side 2 | 115 |
| Luminous transmittance | 28% |
| Surface defects (fish-eyes, orange peel, bubbles, etc.) | none |
| Longitudinal mod. of elasticity | 4175 N/mm² |
| Transverse mod. of elasticity | 5650 N/mm² |
| Longitudinal tear resistance | 165 N/mm² |
| Transverse tear resistance | 250 N/mm² |
| Longitudinal elongation at break | 155% |
| Transverse elongation at break | 75% |

-continued

| | |
|---|---|
| Yellowness Index (YID) | 42 |
| Pigmentation | uniform |

COMPARATIVE EXAMPLE 1

A PET monofilm of 50 μm thickness is produced in a manner similar to that of Example 1. Unlike in Example 1, no UV stabilizer is present in the film.

The unstabilized white film produced has the following property profile:

| | |
|---|---|
| Thickness | 50 μm |
| Surface gloss, side 1 | 70 |
| (Measurement angle 20°) side 2 | 67 |
| Luminous transmittance | 27% |
| Surface defects (fish-eyes, orange peel, bubbles, etc.) | none |
| Longitudinal mod. of elasticity | 4350 N/mm² |
| Transverse mod. of elasticity | 5800 N/mm² |
| Longitudinal tear resistance | 185 N/mm² |
| Transverse tear resistance | 270 N/mm² |
| Longitudinal elongation at break | 160% |
| Transverse elongation at break | 80% |
| Yellowness Index (YID) | 49 |

After 1000 hours of weathering per side using an Atlas Ci 65 Weather-Ometer the film shows signs of embrittlement and cracking on the surfaces. Precise measurement of its property profile is therefore no longer possible. The film has also become visibly yellower.

What is claimed is:

1. A white, biaxially oriented film having a thickness of 1 to 500 μm, which comprises a crystallizable thermoplastic as principal constituent, at least one UV stabilizer, and at least one white pigment, wherein the surface gloss, measured to DIN 67530, using a measurement angle of 20°, is greater than 15.

2. A film as claimed in claim 1, wherein The concentration of the UV stabilizer is 0.01 to 5% by weight, based on the weight of the crystallizable thermoplastic.

3. A film as claimed in claim 1, wherein the UV stabilizer is selected from the group consisting of 2-hydroxybenzotriazoles and triazines.

4. A film as claimed in claim 3, wherein the UV stabilizer is 2-(4,6-diphenyl-1,3,5-triazin-2-yl)-5-(hexyloxy)phenol, 2,2'-methylenebis (6-2H-benzotriazol-2-yl)-(1,1,3,3-tetramethylbutyl)phenol, or a mixture thereof.

5. A film as claimed in claim 4, wherein the white pigment is one or more white pigments selected from the group consisting of titanium dioxide, barium sulfate, calcium carbonate, kaolin and silica.

6. A film as claimed in claim 5, wherein the white pigment is titanium dioxide.

7. A film as claimed in claim 5, wherein the white pigment is coated.

8. A film as claimed in claim 7, wherein the coating is an oxidic coating.

9. A film as claimed in claim 8, wherein the oxidic coating comprises an oxide of aluminum, silicon, zinc or magnesium, or comprises a mixture of two or more of these oxides.

10. A film as claimed in claim 7, wherein the coating comprises an alkanol, fatty add, polydiorganosiloxane, polyorganohydrosiloxane, or a mixture thereof.

11. A film as claimed in claim 1, wherein the amount of white pigment present is 0.3 to 25% by weight, based on the weight of the polymer layer which comprises the white pigment.

12. A film as claimed in claim 1, wherein the average particle size of the white pigment is 0.10 to 0.30 μm.

13. A film as claimed in claim 1, wherein the luminous transmittance, measured to ASTM D 1003, is less than 80%.

14. A film as claimed in claim 1, wherein the longitudinal modulus of elasticity is greater than 3300 N/mm$^2$ and the transverse modulus of elasticity is greater than 4800 N/mm$^2$, measured to ISO 527-1-2.

15. A film as claimed in claim 1, wherein the crystallinity of the crystallizable thermoplastic is 5 to 65%.

16. A film as claimed in claim 1, wherein the crystallizable thermoplastic is selected from the group consisting of polyethylene terephthalate, polybutylene terephthalate, polyethylene naphthalate, and mixtures thereof.

17. A film as claimed in claim 16 wherein the crystallizable thermoplastic comprises polyethylene terephthalate.

18. A film as claimed in claim 17, wherein the polyethylene terephthalate comprises recycled polyethylene terephthalate material.

19. A film as claimed in claim 1, wherein the film has a single-layer structure.

20. A film as claimed in claim 1, wherein the film has a structure of two or more layers, with at least one outer layer and at least one core layer.

21. A film as claimed in claim 20, wherein the structure of two or more layers has two outer layers and one core layer located between the outer layers.

22. A film as claimed in claim 20, wherein at least one UV stabilizer is present in at least one outer layer.

23. A film as claimed in claim 20, wherein at least one white pigment is present in at least one outer layer.

24. A film as claimed in claim 1, wherein the film has an adhesion promoter on at least one side.

25. A film as claimed in claim 1, wherein the film has a copolyester on at least one surface.

26. A film as claimed in claim 1, wherein the film has a scratch-resistant coating on at least one surface.

27. A film as claimed in claim 17, wherein the polyethylene terephthalate used has a standard viscosity SV (DCA), measured in dichloroacetic acid to DIN 53728, of 600 to 1000.

28. A film as claimed in claim 20, wherein at least one outer layer comprises polyethylene terephthalate.

29. A film as claimed in claim 20, wherein at least one outer layer comprises polyethylene naphthalate.

30. A film as claimed in claim 20, wherein at least one outer layer comprises copolymers or other compounds made from polyethylene terephthalate and polyethylene naphthalate.

31. A process for producing a white film as claimed in claim 1, which comprises melting the crystallizable thermoplastic in an extruder together with at least one UV stabilizer and at least one white pigment, extruding it onto a chill roll, orienting it biaxially, setting it and winding it up.

32. The process as claimed in claim 31, wherein the crystallizable thermoplastic is dried in the extruder prior to melting.

33. The process as claimed in claim 31, wherein the UV stabilizer, the white pigment, or both, is added using masterbatch technology.

* * * * *

UNITED STATES PATENT AND TRADEMARK OFFICE
CERTIFICATE OF CORRECTION

PATENT NO. : 7,045,200 B2  Page 1 of 1
APPLICATION NO. : 10/128563
DATED : May 16, 2006
INVENTOR(S) : Ursula Murschall et al.

It is certified that error appears in the above-identified patent and that said Letters Patent is hereby corrected as shown below:

In claim 2, column 14, line 42, "The" should read --the--.

In claim 5, column 14, line 52, "claim 4," should read --claim 1,--.

In claim 10, column 14, line 66, "add," should read --acid,--.

In claim 17, column 15, line 19, "claim 16 wherein" should read --claim 16, wherein--.

In claim 22, column 15, line 32, "claim 20." should read --claim 20,--.

Signed and Sealed this

Twenty-second Day of August, 2006

JON W. DUDAS
*Director of the United States Patent and Trademark Office*